Oct. 11, 1949.　　　D. C. ROBSON ET AL　　　2,484,648
TAPE DISPENSING DEVICE
Filed Nov. 26, 1941
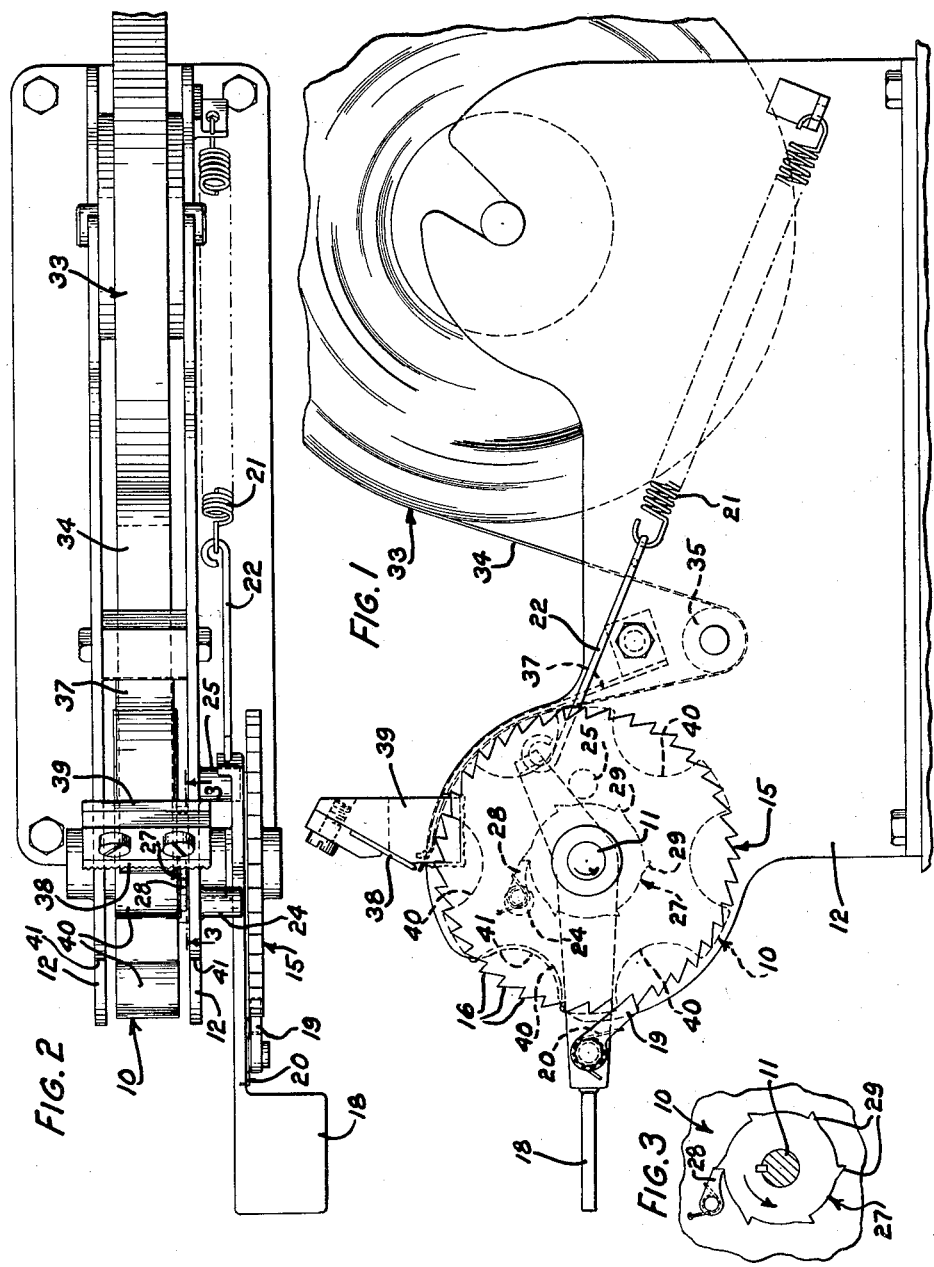
INVENTORS
D. C. ROBSON
C. N. STOVER
BY Harry L. Duft
ATTORNEY Patented Oct. 11, 1949

2,484,648

UNITED STATES PATENT OFFICE 2,484,648

TAPE DISPENSING DEVICE

Duer C. Robson, Baltimore, and Clyde N. Stover, Towson, Md., assignors to Western Electric Company, Incorporated, New York, N. Y., a corporation of New York Application November 26, 1941, Serial No. 420,510

18 Claims. (Cl. 164—84.5)

This invention relates to a tape dispensing device, and more particularly to a device for dispensing a non-drying adhesive tape.

An object of the invention is to provide a simple and efficient device for dispensing adhesive tape from a supply roll thereof.

In accordance with one embodiment of the invention, there is provided a tape dispensing device in which a tape dispensing wheel is rotated by a manually operated indexing means to withdraw predetermined lengths of tape from a supply roll thereof, the wheel having a series of peripheral notches for facilitating the removal of the tape therefrom. A free-wheeling connection is provided for connecting the wheel to the indexing means so that the wheel may rotate independently of the indexing means to permit the withdrawal of any desired length of tape from the supply roll.

Other features and advantages of the invention will become apparent from the following detailed description when read in conjunction with the acccompanying drawing, in which Fig. 1 is a side elevational view of a tape dispensing device embodying the features of the invention;

Fig. 2 is a plan view thereof, and

Fig. 3 is a detail sectional view taken on line 3—3 of Fig. 2.

The tape dispenser illustrated in the drawing comprises a tape dispensing wheel 10 which is loosely mounted on a horizontal shaft 11 rotatively journaled in the forward ends of spaced side plates 12—12 of a suitable supporting frame. Attached to the shaft 11 so as to rotate therewith is a ratchet wheel 15 provided with a series of equidistantly spaced peripheral teeth 16, 16. A hand lever 18 is pivoted intermediate its ends upon the shaft 11 and carries a pivoted pawl 19 which is urged by a spring 20 into operative engagement with the teeth of the ratchet wheel. The arrangement is such that when the hand lever is depressed, the ratchet wheel is indexed or rotated by the pawl 19 in a counterclockwise direction (Fig. 1). A spring 21 restores the hand lever to its original position when it is released. One end of this spring is attached to one of the side plates 12 and the opposite end of the spring is connected to the hand lever by a link 22. Stop pins 24 and 25 attached to one of the supporting plates serve to limit the range of movement of the hand lever.

The tape dispensing wheel 10 is operatively connected to the shaft 11 through a free-wheeling device comprising a toothed disk 27 keyed to the shaft and a cooperating spring pressed pawl 28 pivotally carried by the tape dispensing wheel. The disk 27 has a series of equidistantly spaced peripheral teeth 29, 29 and when the pawl 28 is in engagement with one of these teeth, as shown in Figs. 1 and 3, the tape dispensing wheel is constrained to rotate with the shaft 11 when the latter is rotated in a counterclockwise direction (Fig. 1) by depressing the hand lever 18. However, the free-wheeling connection permits counter-clockwise movement of the tape dispensing wheel independently of the shaft, since the pawl 28 is adapted to slide over the teeth of the free-wheeling disk when the tape dispensing wheel is rotated counterclockwise by a force applied directly to the wheel.

A supply roll 33 of adhesive tape 34 is rotatively mounted between the side plates 12 near the rear ends thereof. When drawn from this supply roll, the tape passes under and around a guide roller 35 and then upwardly over the tape dispensing wheel. It will be noted that the dry back side of the tape engages the guide roller, while the adhesive side of the tape contacts the tape dispensing wheel. A curved spring 37 serves to press the tape against the periphery of the wheel. This causes the tape to adhere to the wheel and thus provide sufficient traction for withdrawing the tape from the roll when the wheel is rotated in a counter-clockwise direction (Fig. 1).

Above the tape dispensing wheel, a stationary knife 38 is attached to a bracket 39 secured to and extending between the side plates 12 of the supporting frame. The cutting edge of this knife is disposed slightly above the tape dispensing wheel so that the tape is free to pass under the knife as it is withdrawn from the supply roll.

The tape dispensing wheel is provided with a series of equidistantly spaced peripheral notches or cut-outs 40, 40 equal in number to the number of teeth 29 on the free-wheeling disk 27. In the illustrated embodiment of the invention, the free-wheeling disk is provided with six equidistantly spaced teeth and the tape dispensing wheel is provided with six equidistantly spaced cut-outs. Also, the indexing lever 18 and the associated pawl and ratchet mechanism are constructed and arranged to index the tape dispensing wheel one-sixth of a revolution for each complete operating stroke of the lever, and the wheel is initially set so that after each indexing operation, one of the cut-outs 40 will be centrally located with respect to the cutting edge of the knife. Thus, after each indexing operation, the previously severed end of the tape extends half-way across one of the cut-outs and, therefore, is conveniently accessible for removal by the operator particularly since the cut-outs are large enough to permit the operator to insert a finger underneath the free end of the tape to grasp it firmly. A notch 41 may be provided in one or both of the side plates 12 to render the end of the tape more conveniently accessible.

The operation of the device is as follows: By depressing the hand lever 18, the ratchet 15 and shaft 11 are rotated through one-sixth of a revolution in a counter-clockwise direction (Fig. 1), and through free-wheeling disk 27 and pawl 28, the tape dispensing wheel 10 is also rotated through one-sixth of a revolution in the same direction. A predetermined amount of tape, corresponding in length to one-eixth the circumference of the tape dispensing wheel, is thus advanced past the stationary serrated knife 38. The operator then grasps the free end of the tape and pulls it upwardly, thus removing the previously advanced end portion of the tape from the wheel, whereupon it is severed by being drawn across the cutting edge of the knife. Since one of the cut-outs 40 of the tape dispensing wheel is centrally located with respect to the cutting edge of the knife after each indexing operation, the end of the tape is always left freely suspended in one of the cut-outs so that it may be easily grasped by the operator. The cut-outs serve the additional function of reducing the peripheral surface of the wheel which comes in contact with the tape.

When long lengths of tape are required, the device is operated as follows: The hand lever is first depressed only sufficiently to advance enough tape past the knife so that the end of the tape may be grasped by the operator. The end of the tape is then pulled by the operator until the approximate length of tape required has been advanced past the knife. This withdrawal of the tape by the operator rotates the tape dispensing wheel counterclockwise (Fig. 1), while the shaft 11 and ratchet wheel 15 remain stationary due to the free-wheeling connection above described. After the approximate length of tape required has been withdrawn by the operator, the hand lever is completely depressed to insure that the tape dispensing wheel is properly positioned with respect to the knife so that one of the cut-outs 40 is centrally located with respect to the cutting edge of the knife. The withdrawn end portion of the tape is then severed by being drawn across the knife as described above.

It should be understood that the novel features of the invention are not limited to the particular embodiments thereof herein illustrated and described, but are capable of other applications within the scope of the appended claims.

What is claimed is:

1. In an adhesive tape dispensing device, a rotary tape dispensing wheel mounted for peripheral engagement with the adhesive side of a continuous length of adhesive tape as it is withdrawn from a supply thereof, means for rotating the wheel to withdraw predetermined lengths of tape from the supply, and means for severing the tape, said wheel having a peripheral notch for permitting the insertion of an operator's finger underneath the tape on the wheel to remove the tape from the wheel.

2. In an adhesive tape dispensing device, a rotary tape dispensing wheel mounted for peripheral engagement with the adhesive side of a continuous length of adhesive tape extending from a supply thereof, whereby a portion of said tape is fed from said supply and applied to said wheel upon rotation of said wheel, said wheel having a plurality of angularly spaced peripheral notches, a tape severing knife disposed adjacent the peripheral surface of said wheel, and indexing means for rotating said wheel comprising a pawl and ratchet mechanism adapted to present one of the notches opposite said knife at the completion of each indexing operation.

3. In an adhesive tape dispensing device, a rotary tape dispensing wheel mounted for peripheral engagement with the adhesive side of a continuous length of adhesive tape as it is withdrawn from a supply thereof, said wheel having a plurality of angularly spaced peripheral notches, a tape severing knife disposed adjacent the peripheral surface of said wheel, and indexing means for said wheel comprising a lever coaxial with said wheel, a free wheeling connection between said lever and said wheel, and means for limiting the angular movement of said lever to a range just sufficient to present one of the notches opposite the knife at the completion of each indexing operation.

4. In an adhesive tape dispensing device, a rotary shaft, a tape dispensing wheel mounted on and driven by said shaft, a tape severing knife disposed adjacent the peripheral surface of said wheel, said wheel having a plurality of angularly spaced peripheral notches, a ratchet coaxially secured to said shaft, an indexing lever pivoted on said shaft, a pawl on said lever in driving engagement with said ratchet, and means for limiting the angular movement of said lever to a range just sufficient to present one of the notches opposite the knife at the completion of each indexing operation.

5. In an adhesive tape dispensing device, a rotary shaft, a tape dispensing wheel loosely mounted on said shaft, a tape severing knife disposed adjacent the peripheral surface of said wheel, said wheel having a plurality of equidistantly spaced peripheral finger receiving notches, a free-wheeling connection comprising a ratchet wheel fixed to said shaft and a cooperating pawl on said tape dispensing wheel through which said tape dispensing wheel is rotated in one direction by the rotation of said shaft in said direction, said ratchet wheel having a plurality of equidistantly spaced teeth corresponding in number to the number of finger notches in said tape dispensing wheel, and means for rotating said shaft in the said direction, said means comprising an oscillatory lever, a pawl and ratchet mechanism operatively connecting said lever with said shaft, and means for limiting the angular movement of said lever to a range just sufficient to present one of the finger notches opposite the knife at the completion of each actuation of the lever.

6. An adhesive tape dispensing device comprising a rotary member mounted for peripheral engagement with the adhesive side of a continuous length of adhesive tape extending from a supply thereof, whereby a portion of said tape is fed from said supply and applied to said member upon rotation of said member, said member having a peripheral notch for permitting the insertion of an operator's finger underneath said fed tape portion to remove it from said rotary member, and means for severing said fed portion of the tape from said continuous length thereof.

7. An adhesive tape dispensing device comprising a rotary tape dispensing wheel mounted for peripheral engagement with the adhesive side of a continuous length of adhesive tape extending from a supply thereof, whereby a portion of said tape is fed from said supply and applied to said wheel upon rotation of said wheel, said wheel having a circumferential series of angularly spaced peripheral notches, each adapted to permit the insertion of an operator's finger underneath a previously fed tape portion to remove it from said wheel, and means for severing said fed portion of the tape from said continuous length thereof.

8. In an adhesive tape dispensing device, a rotary tape dispensing wheel mounted for peripheral engagement with the adhesive side of a continuous length of adhesive tape extending from a supply thereof, whereby a portion of said tape is fed from said supply and applied to said wheel upon rotation of said wheel, a tape severing knife disposed adjacent the peripheral surface of said wheel, said wheel having a plurality of angularly spaced peripheral finger receiving notches, an indexing mechanism for rotating said wheel comprising a pawl and ratchet mechanism operatively connected to said wheel, said ratchet having a plurality of pawl engaging teeth corresponding in number and spacing to the number and spacing of the finger receiving notches, whereby one of said notches is presented opposite said knife at the completion of each operation of said indexing mechanism, and means for operating said indexing mechanism.

9. In an adhesive tape dispensing device, a rotary shaft, a tape dispensing wheel loosely mounted on said shaft for engagement with the adhesive side of a continuous length of adhesive tape extending from a supply thereof, whereby a portion of said tape is fed from said supply and applied to said wheel upon rotation of said wheel, a tape severing knife disposed adjacent the peripheral surface of said wheel, said wheel having a plurality of angularly spaced peripheral finger receiving notches, and means for rotating said wheel comprising a pawl on said wheel, a cooperating ratchet wheel fixed to said shaft and having a plurality of pawl engaging teeth corresponding in number and spacing to the number and spacing of said finger receiving notches on said tape dispensing wheel, and means for imparting to said shaft successive angular movements, the extent of which correspond to the angular spacings between said ratchet teeth.

10. An adhesive tape dispensing device comprising a rotary tape dispensing wheel mounted for peripheral engagement with the adhesive side of a continuous length of adhesive tape extending from a supply thereof whereby a portion of said tape is fed from said supply and applied to said wheel upon rotation of said wheel in one direction, a tape severing knife disposed adjacent the peripheral surface of said wheel, said wheel having a plurality of angularly spaced peripheral notches, each adapted to permit the insertion of an operator's finger underneath a previously fed tape portion to remove it from said wheel, and indexing means for rotating said wheel in said direction comprising an oscillatory lever, means for limiting the range of movement of said lever, and a free wheeling driving connection between said lever and said wheel whereby said wheel is free to be rotated in said direction independently of said lever, said driving connection being constructed and arranged to limit the effective portion of said range of movement of said lever to an amount just sufficient to present one of said notches opposite said knife at the completion of each actuation of said lever.

11. In an apparatus for dispensing tacky tape, means for holding a supply of the tape, a rotatable reel for withdrawing tape from the supply and supporting said tape pending removal therefrom, said reel including tape engaging supports spaced circumferentially of the reel at fixed distances from each other equal to at least the distance necessary to permit the insertion of the finger of the operator between each pair of supports and extending transversely across the path of the tape, and a cutter mounted adjacent to the periphery of the reel and in stationary relation thereto, said cutter extending transversely of the path of the tape and against which the tape may be drawn upon removal from the reel so as to sever the same.

12. In an apparatus for dispensing tacky tape, means for holding a supply of the tape, a rotatable reel for withdrawing tape from the supply and supporting said tape pending removal therefrom, said reel including tape engaging supports spaced circumferentially of the reel at fixed distances from each other equal to at least the distance necessary to permit the insertion of the finger of the operator between each pair of supports and extending transversely across the path of the tape, a cutter mounted adjacent to the periphery of the reel and extending transversely of the path of the tape, and against which the tape may be drawn upon removal from the reel so as to sever the same, and means for locking the reel against rotation while the tape is being removed and severed.

13. In an apparatus for dispensing tacky tape, means for holding a supply of tape, a rotatable reel for withdrawing tape from the supply and supporting said tape pending removal therefrom, said reel having tape engaging supports spaced circumferentially of the reel and at fixed distances from each other equal to at least the distance necessary to permit the insertion of the finger of the operator between each pair of supports and extending transversely of the path of the tape, a tear-off cutter mounted adjacent the periphery of reel and a stop to hold the reel in rigid relationship to the cutter during the cutting operation.

14. In an apparatus for dispensing tacky tape, means for holding a supply of tape, a rotatable reel for withdrawing tape from the supply and supporting said tape pending removal therefrom, said reel having tape engaging supports spaced circumferentially of the reel and at fixed distances from each other and extending transversely of the path of the tape, a tear-off cutter mounted adjacent the periphery of the reel in position for removal of a piece of tape approximately equal in length to the distance between the edges of said supports or multiples thereof.

15. In an apparatus for dispensing tacky tape, means for holding a supply of the tape, a rotatable wheel for withdrawing the tape from the supply and supporting the tape pending removal therefrom, said wheel including a broken tape engaging surface constructed and arranged to present sufficient contact areas for engagement with the adhesive surface of the tape, so that when said wheel is rotated it will withdraw tape from the supply and advance the same to a position of delivery, said areas being limited in extent to permit the tape to be grasped for removal from said surface, means for rotating said wheel to withdraw tape from the supply and a cutter mounted transversely across the path of the tape and against which the tape, when removed from the wheel, may be withdrawn and torn off.

16. In an adhesive tape dispensing device, a rotary tape dispensing wheel mounted for peripheral engagement with the adhesive side of a continuous length of adhesive tape extending from a supply thereof, whereby a portion of said tape is fed from said supply and applied to said wheel upon rotation of said wheel, said wheel having a plurality of angularly spaced peripheral notches, a tape severing knife for cutting the tape into sections, indexing means for rotating said wheel a distance corresponding to the spacing of said notches upon each indexing operation, and a unidirectional connection between said indexing means and said wheel whereby said wheel may be rotated by the manual withdrawal of tape to provide lengths of tape longer than lengths advanced by said indexing means.

17. In an adhesive tape dispensing device, a rotary tape dispensing wheel mounted for peripheral engagement with the adhesive side of a continuous length of adhesive tape extending from a supply thereof, whereby a portion of said tape is fed from said supply and applied to said wheel upon rotation of said wheel, said wheel having a plurality of angularly spaced peripheral notches, a tape severing knife for cutting the tape into sections, indexing means for rotating said wheel to present predetermined lengths of tape for cutting, and a unidirectional connection between said indexing means and said wheel whereby said wheel may be rotated by the manual withdrawal of tape to present long lengths of tape for cutting.

18. In an adhesive tape dispensing device, a rotary tape dispensing wheel mounted for peripheral engagement with the adhesive side of a continuous length of adhesive tape extending from a supply thereof, whereby a portion of said tape is fed from said supply and applied to said wheel upon rotation of said wheel, said wheel having a plurality of angularly spaced peripheral notches, a tape severing knife for cutting the tape into sections, indexing means for rotating said wheel to present one of the notches opposite the knife after each indexing operation, and a free wheeling connection between said indexing means and said wheel to permit manual withdrawal of any selected length of tape, said free wheeling connection including means for restoring the normal position of said notches relative to the knife upon the next indexing operation.

DUER C. ROBSON.
CLYDE N. STOVER.

REFERENCES CITED

The following references are of record in the file of this patent:

UNITED STATES PATENTS

| Number | Name | Date |
|---|---|---|
| 1,860,668 | Gillet | May 31, 1932 |
| 1,972,850 | McCarthy | Sept. 4, 1934 |
| 2,005,898 | LaGrange | June 25, 1935 |
| 2,233,361 | Anderson et al. | Feb. 25, 1941 |
| 2,274,623 | Hawkins | Feb. 24, 1942 |

FOREIGN PATENTS

| Number | Country | Date |
|---|---|---|
| 39,493 | Netherlands | Nov. 16, 1936 |